US008937860B2

(12) United States Patent
Thomas et al.

(10) Patent No.: US 8,937,860 B2
(45) Date of Patent: Jan. 20, 2015

(54) HANDOFF OF A MOBILE STATION BETWEEN PACKET-SWITCHED AND CIRCUIT-SWITCHED WIRELESS DOMAINS

(71) Applicant: Rockstar Consortium US LP, Richardson, TX (US)

(72) Inventors: Michael Thomas, Tigard, OR (US); Saso Stojanovski, Paris (FR); Eric Parsons, Stittsville (CA)

(73) Assignee: Rockstar Consortium US LP, Plano, TX (US)

( * ) Notice: Subject to any disclaimer, the term of this patent is extended or adjusted under 35 U.S.C. 154(b) by 82 days.

(21) Appl. No.: 13/666,201

(22) Filed: Nov. 1, 2012

(65) Prior Publication Data
US 2013/0070730 A1 Mar. 21, 2013

Related U.S. Application Data

(63) Continuation of application No. 12/831,496, filed on Jul. 7, 2010, now Pat. No. 8,320,334.

(51) Int. Cl.
*H04L 12/26* (2006.01)
*H04W 4/00* (2009.01)
*H04W 36/00* (2009.01)
(Continued)

(52) U.S. Cl.
CPC ....... *H04W 36/0022* (2013.01); *H04L 65/1016* (2013.01); *H04L 65/1053* (2013.01); *H04L 65/103* (2013.01); *H04W 88/06* (2013.01)
USPC ........... 370/230; 370/331; 370/338; 455/436; 455/442

(58) Field of Classification Search
CPC ............ H04W 36/00; H04W 36/0005; H04W 36/0011; H04W 36/0016; H04W 36/0022; H04W 36/0027; H04W 36/0033; H04W 36/0038; H04W 36/0044; H04W 36/0088; H04W 36/0094; H04W 36/06; H04W 88/06; H04W 88/08; H04W 88/12; H04W 88/14; H04W 88/16; H04W 88/18; H04W 28/00; H04L 65/103; H04L 65/105; H04L 65/1013; H04L 65/1016; H04L 65/1046; H04L 65/1053; H04L 12/00; H04L 45/00
USPC ......... 370/229–240, 310–356, 401, 422, 428, 370/437, 445, 458, 461–462; 455/406, 423, 455/427–428, 431–444, 552.1, 560
See application file for complete search history.

(56) References Cited

U.S. PATENT DOCUMENTS 8,160,976 B2 4/2012 Dwyer et al.
8,320,334 B2 * 11/2012 Thomas et al. ............... 370/331
(Continued)

*Primary Examiner* — Tri H Phan
(74) *Attorney, Agent, or Firm* — Christopher & Weisberg, P.A.

(57) ABSTRACT

A first mobility management entity (MME) is configured to cooperate with a first access network controller to provide a circuit switched service to a mobile station while the mobile station is attached to a packet switched wireless access network in a first coverage area. A second MME is configured to cooperate with the first access network controller to provide a circuit switched service to the mobile station when the mobile station has moved from the first coverage area to the second coverage area. A home subscriber system is configured to provide, to the second MME, information identifying the first access network controller as serving the mobile station to enable the second MME to initiate handoff of the mobile station from the packet switched wireless access network to the circuit switched wireless access network.

9 Claims, 5 Drawing Sheets

(51) Int. Cl.
*H04L 29/06* (2006.01)
*H04W 88/06* (2009.01)

(56) References Cited

U.S. PATENT DOCUMENTS

| | | | | |
|---|---|---|---|---|
| 8,335,187 B2* | 12/2012 | Wilhoite et al. | ............. | 370/331 |
| 8,391,241 B2* | 3/2013 | Vikberg et al. | ............. | 370/331 |
| 8,483,175 B2* | 7/2013 | Jentz et al. | ................ | 370/331 |
| 8,743,825 B2* | 6/2014 | Sebire et al. | ................ | 370/331 |
| 8,780,856 B2* | 7/2014 | Madour et al. | ............... | 370/331 |
| 2008/0176572 A1* | 7/2008 | Forsberg | .................... | 455/438 |
| 2009/0080382 A1 | 3/2009 | Chen et al. | | |
| 2010/0040020 A1* | 2/2010 | Chen | ............... | 370/331 |
| 2010/0135246 A1* | 6/2010 | Hallental | .................... | 370/331 |
| 2010/0309886 A1 | 12/2010 | Vikberg et al. | | |
| 2011/0110326 A1 | 5/2011 | Rexhepi et al. | | |
| 2011/0200011 A1* | 8/2011 | Rune | ............... | 370/331 |
| 2011/0207462 A1* | 8/2011 | Hallenstal et al. | ............ | 455/436 |
| 2011/0274090 A1 | 11/2011 | Hallensal et al. | | |
| 2012/0003974 A1 | 1/2012 | Nylander et al. | | |
| 2013/0217362 A1* | 8/2013 | Young | ............... | 455/413 |

* cited by examiner

HANDOFF OF A MOBILE STATION BETWEEN PACKET-SWITCHED AND CIRCUIT-SWITCHED WIRELESS DOMAINS

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services.

SUMMARY

A first mobility management entity associated with a packet-switched wireless access network receives information associated with a mobile station being served by the first mobility management entity, where the information identifies a serving generic access network controller for the mobile station. The serving generic access network controller is used to provide a circuit-switched service to the mobile station while the mobile station is attached to the packet-switched wireless access network. The first mobility management entity initiates a handoff of the mobile station from the packet-switched wireless access network to a circuit-switched wireless access network, where the circuit-switched wireless access network is in a region served by a second generic access network controller different from the serving generic access network controller. In performing the handoff, the first mobility management entity uses the information to identify the serving generic access network controller to communicate handoff-related messaging to the serving generic access network controller to cause provision of the circuit-switched service to be handed off from the serving generic access network controller to the second generic access network controller.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Wireless service operators are transitioning to packet-switched access technologies such as the Long Term Evolution (LTE) technology. The LTE technology is also referred to as the EUTRA (Evolved Universal Terrestrial Radio Access) technology. The EUTRA technology or standard is defined by the Third Generation Partnership Projection (3GPP).

With a packet-switched wireless access technology such as that provided by EUTRA, traditional circuit-switched services may no longer be supported. Examples of traditional circuit-switched services include circuit-switched voice calls, short message services (SMS) (which allows text communications between mobile stations), and so forth.

In some implementations, to enable the provision of circuit-switched services over a packet-switched wireless access network, such as an LTE wireless access network, a solution referred to as voice-over-LTE-via-generic access network, or VoLGA, has been defined. The general concept is to connect circuit-switched infrastructure, including mobile switching centers (MSCs), to the EUTRA network using a gateway. VoLGA is based on the 3GPP Generic Access Network (GAN) standard. The GAN standard is designed to extend mobile services over a generic IP access network, such as WiFi networks. VoLGA extends the GAN capability to EUTRA packet-switched wireless access networks.

VoLGA specifications are published by the VoLGA forum. The GAN architecture is described in 3GPP TS 43.318. Although reference is made to particular standards or technologies, it is noted that techniques according to some embodiments can be applied to other types of technologies or standards. Reference to "EUTRA" is intended to cover both existing EUTRA standards as well as subsequent standards evolved from the present standards. Similarly, reference to "VoLGA" standards is intended to cover both the existing VoLGA standards as well as subsequent standards evolved from VoLGA.

Figure 1:
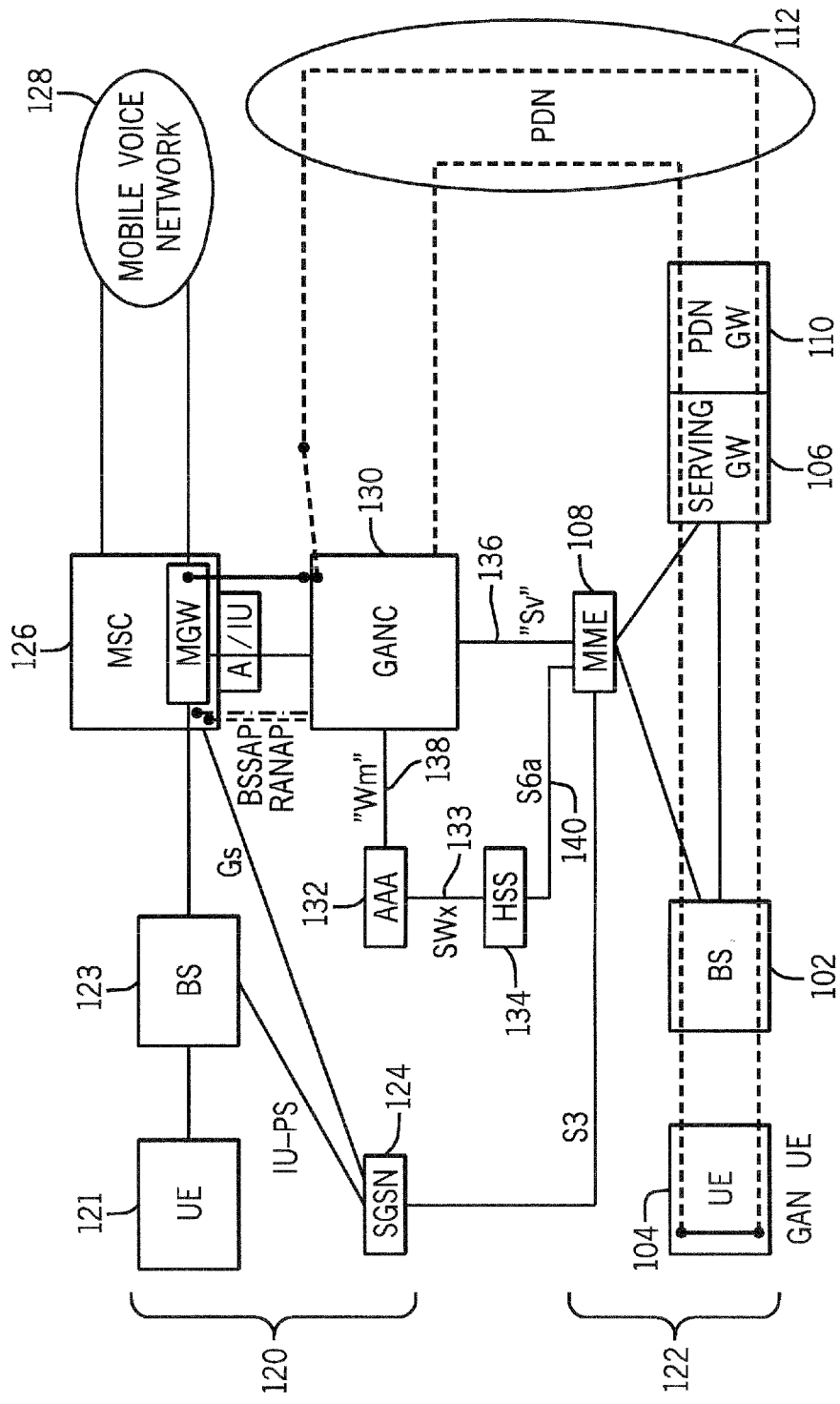
FIG. 1 is a block diagram of an example arrangement including packet-switched and circuit-switched wireless access networks in which some embodiments can be incorporated.

FIG. 1 is a block diagram of an example arrangement that supports circuit-switched-over-EPS-via-GAN services. Providing circuit-switched-over-EPS-via-GAN services allows a network to not have to rely on Internet Protocol (IP) Multimedia (IMS) services, for example. IMS services are packet-switched services. "EPS" or "Evolved packet system" refers to a system that supports packet-switched wireless access networks. An example of an EPS system is an EUTRA network. With the arrangement of FIG. 1, circuit-switched services can be provided to a mobile station while the mobile station is attached to a packet-switched wireless access network, such as an EUTRA access network. In the example of FIG. 1, an EUTRA network 100 includes a base station 102 that is able to wirelessly connect to a mobile station 104 that is in a coverage area of the EUTRA network 100. In the EUTRA context, the base station 102 is referred to as an enhanced node B (eNodeB). A "base station" can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or the radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth. A relay station has elements that act in a similar way to a base station, and elements that act in a similar way to a "mobile station."

The base station 102 is connected to various components, including a serving gateway 106 and a mobility management entity (MME) 108. The MME 108 is a control node for the EUTRA network 100. For example, the MME 108 is responsible for mobile station tracking and paging procedures. The MME 108 is also responsible for choosing the serving gateway for a mobile station at initial attach and at the time of handover. The MME 108 can also be responsible for authenticating the user of a mobile station. More generally, the term "mobility management entity" refers to any control node associated with a wireless access network that performs various control functions on behalf of mobile stations in the coverage area of the wireless access network.

The serving gateway 106 routes bearer data packets. The serving gateway 106 also acts as a mobility anchor for the mobile station during handovers between different access networks. The serving gateway 106 is connected to a packet data network 110 that provides connectivity between the mobile station 104 and a packet data network 112 (e.g., the Internet, a network that provides various services, etc.).

Although just one base station 102, MME 108, serving gateway 106, and PND gateway 110 are depicted, it is noted that there can be additional such nodes in the EUTRA network 100.

FIG. 1 also shows a circuit-switched network 120, which has a base station 123 (to which a mobile station 121 can be wirelessly attached), a serving GPRS support node (SGSN 124), and an MSC (mobile switching center) 126. Provision of circuit-switched services is controlled by the MSC 126. The MSC 126 is connected to a mobile voice network 128. The circuit-switched network 120 of FIG. 1 is according to a Global System for Mobile (GSM) technology, as defined by 3GPP. In other implementations, the circuit-switched network 120 can be according to another technology.

As depicted in the arrangement of FIG. 1, a generic access network controller (GANC) 130 is provided. Provision of the GANC 130 allows for support of circuit-switched services over a packet-switched wireless access network, such as for the mobile station 104 that is attached to the packet-switched wireless access network. The GANC 130 can also be referred to as a VANC (VoLGA access network controller) in implementations using VoLGA.

FIG. 1 also depicts an authentication, authorization, and accounting (AAA) server 132, which is connected to the GANC 130. The AAA server 132 is used for performing authentication, authorization, and accounting tasks with respect to mobile stations. In addition, FIG. 1 shows a home subscriber server (HSS) 134 connected to the AAA server 132. The HSS 134 stores subscriber profiles that define capabilities and other information associated with mobile stations. The HSS 134 is connected to the MME 108. The MME 108 is also connected to the GANC 130.

An interface between the MME 108 and the GANC 130 is referred to as an Sv interface 136, where the Sv interface 136 is used to support handoff procedures between packet-switched wireless access networks and circuit-switched wireless access networks.

Also depicted in FIG. 1 is a Wm interface 138 between the AAA server 132 and the GANC 130, where the Wm interface allows the GANC 130 to establish a secure session with a mobile station. The Wm interface 138 also allows for the indirect provision of information to the HSS 134 for identifying a serving GANC to an MME, as discussed further below.

An interface between the AAA server 132 and the HSS 134 is an SWx interface 133. The forwarding of information from an HSS to an MME is over an interface referred to as an S6a interface 140.

Although specific connections and interfaces, as well as specific nodes, are depicted in FIG. 1, it is noted that alternative embodiments can use other arrangements.

Figure 2:
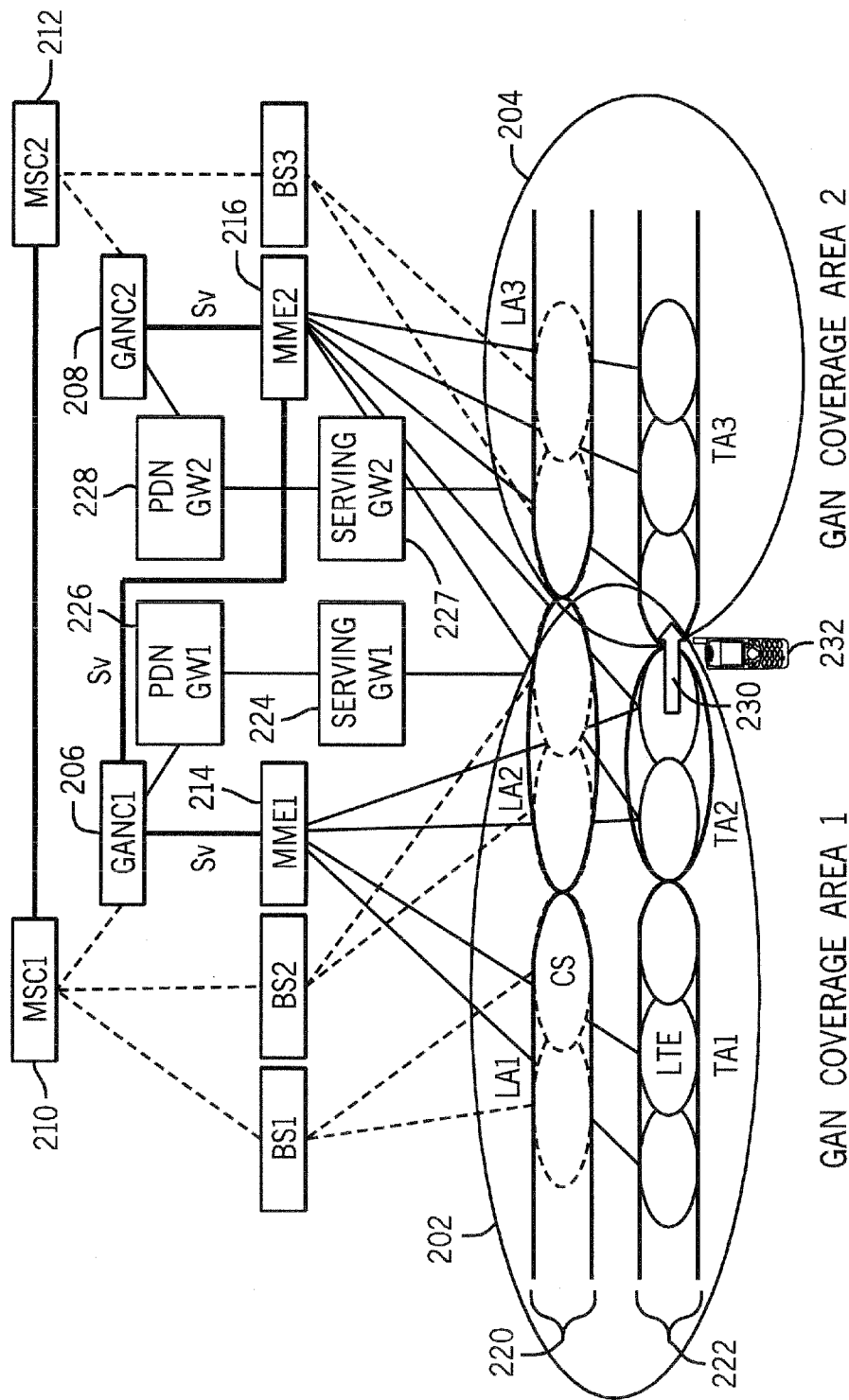
FIGS. 2 and 3 illustrate transitioning of a mobile station between different areas of a communication network, according to some embodiments.

FIG. 2 illustrates a distributed arrangement that includes two GAN coverage areas 202 and 204 that are served by respective GANC 206 and GANC 208, respectively. A mobile station 232 that is attached to a wireless access network in the GAN coverage area 202 is supported by GANC 206, whereas a mobile station that is attached to a wireless access network in the GAN coverage area 204 is supported by GANC 208.

Also, as depicted in FIG. 2, an MSC 210 serves mobile stations attached to wireless access networks in the GAN coverage area 202, while another MSC 212 serves mobile stations attached to wireless access networks in the GAN coverage area 204. As further illustrated in the example of FIG. 2, a first MME 214 serves mobile stations attached to wireless access networks in the GAN coverage area 202, while another MME 216 serves mobile stations attached to wireless access networks in the GAN coverage area 204.

FIG. 2 also shows base stations (BS1, BS2) connected to the MSC 210, and BS3 connected to the MSC 212.

As depicted in the example of FIG. 2, a circuit-switched domain 220 is organized into location areas LA1, LA2, and LA3. The location area LA1 is served by BS1, while the location area LA2 is served by BS2. The location area LA3 is served by BS3. The location areas LA1 and LA2 are in the GAN coverage area 202, while the location area LA3 is located in the GAN coverage area 204.

A packet-switched domain 222 (or more specifically in some examples, an EUTRA domain) is organized into tracking areas TA1, TA2, and TA3, where TA1 and TA2 are served by MME 214, and TA3 is served by MME 216. The tracking areas TA1 and TA2 are located in the GAN coverage area 202 and the tracking area TA3 is located in GAN coverage area 204. FIG. 2 also shows a serving gateway 224 and PDN gateway 226 that is associated with MME 214, and a serving gateway 227 and PDN 228 associated with MME 216.

When the mobile station 232 is attached to an EUTRA access network, and the mobile station is provided with circuit-switched services over EPS (e.g., the EUTRA access network), the mobile station is led by the EUTRA access network towards the geographically closest GANC (in other words, the GANC serving the GAN coverage area where the mobile station is currently attached). For example, when the mobile station 232 is attached to an EUTRA access network in tracking area TA1, the mobile station is provided with circuit-switched services by GANC 206, since TA1 is in the GAN coverage area 202 associated with GANC 206.

Due to mobility, it is possible that the mobile station 232 can move between different GAN coverage areas, as indicated by arrow 230 in FIG. 2, for example (between GAN coverage area 202 and GAN coverage area 204). Even though the mobile station has transitioned between different GAN coverage areas, the mobile station maintains its association with the original serving GANC (e.g., GANC 206). Thus, in the example of FIG. 2, when the mobile station 232 is originally in the GAN coverage area 202, the mobile station 232 is served by GANC 206. After transitioning (230) from GAN coverage area 202 to GAN coverage area 204, the mobile station 232 continues to be served by GANC 206, even though the GAN coverage area 204 is associated with GANC 208.

A mobile station registered to GANC 206 is served by MSC 210. When the mobile station 232 transitions from EUTRA tracking area TA2 to EUTRA tracking area TA3, the mobile station 232 is handed off from MME 214 to MME 216 (in other words, the active context for the mobile station is transferred from MME 214 to MME 216). Note that the GANC has to be able to accept connections from any MME in a particular region.

Figure 3:
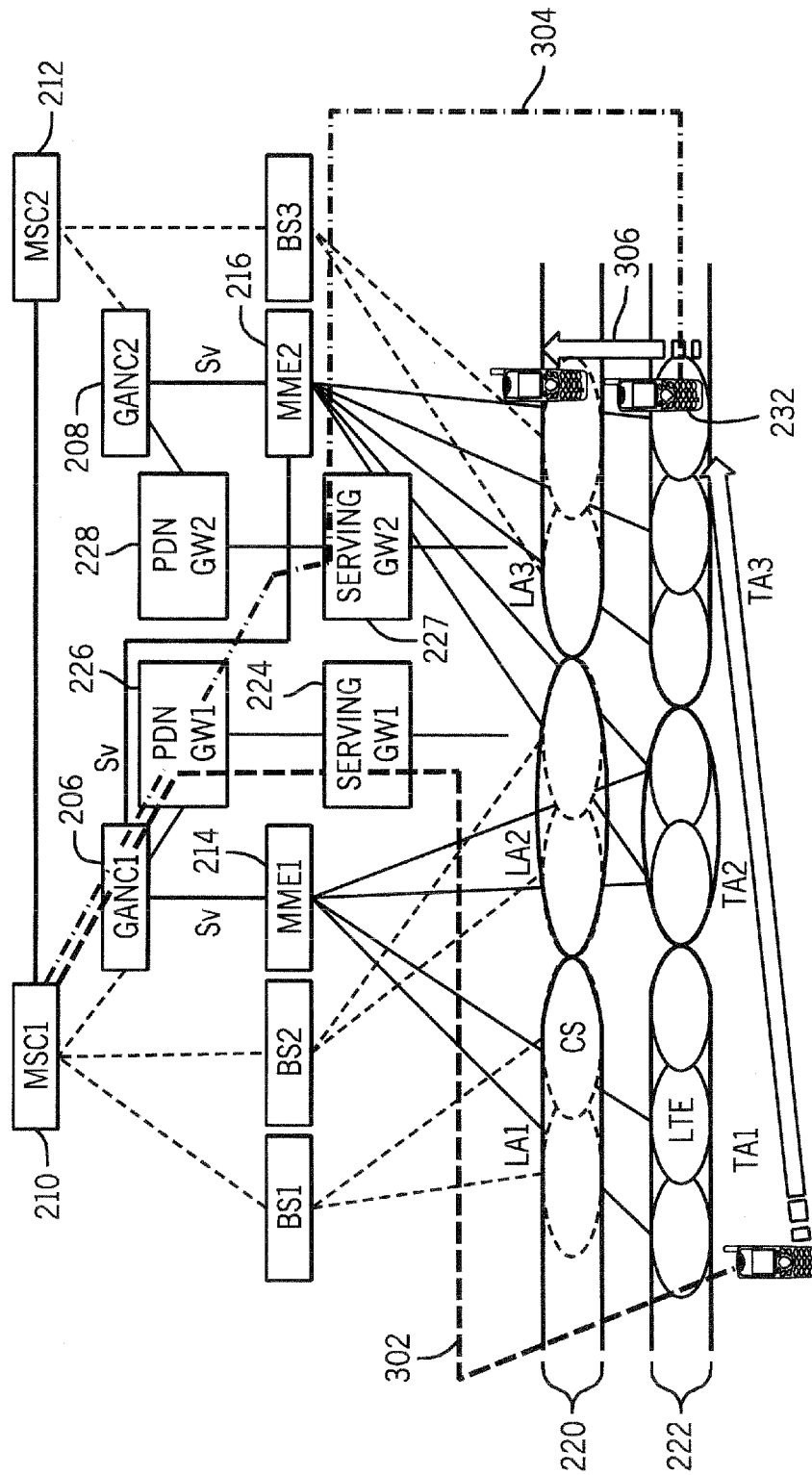

As further shown in FIG. 3, assuming that the mobile station 232 is originally attached to tracking area TA1 of the EUTRA domain 222, a path 302 depicts the provision of circuit-switched services by the MSC 210 to the mobile station 232 through the serving gateway 224, PDN gateway 226, and GANC 206.

Assuming that the mobile station 232 has ultimately transitioned to tracking area TA3 of the EUTRA domain 222, a path 304 depicts the provision of circuit-switched services by the original MSC 210 to the mobile station 232 after transitioning to TA3. Note that although mobile station 232 in tracking area TA3 is now in the second GAN coverage area 204 (see FIG. 2), the mobile station 232 is still provided with circuit-switched services by the original serving GANC 206. Note that the mobile station 232 when in the tracking area 283 is served by the MME 216.

It is also possible that the mobile station can further transition from the EUTRA domain 222 (e.g., TA3) to the circuit-switched domain 220 (to location area LA3 in the example of FIG. 3). This transition is indicated by arrow 306 in FIG. 3. To handoff the mobile station to the circuit-switched domain 220, the handoff request from the MME 216 associated with TA3 has to be forwarded to the original serving GANC 206, and not to the GANC 208 that is associated with GAN coverage area 204 in which TA3 is located. Sending a handoff request from MME 216 to GANC 208 would result in an error, since GANC 208 is not currently serving the call session for the mobile station 232.

Without techniques according to some embodiments, the MME 216 would have no ability to find the correct GANC for sending the handoff request. Techniques according to some embodiments specify that a mobile station is to perform a re-authentication procedure whenever the mobile station re-registers to a GANC. Such an authentication procedure is executed via the Wm interface between a GANC and an AAA server, such as the Wm interface 138 shown in FIG. 1. Information relating to the authentication procedure is provided from the AAA server 132 to the HSS 134, over the SWx interface 133. The information passed from the AAA server 132 to the HSS 134 as part of the authentication procedure includes an identity of the serving GANC, which can be an IP (Internet Protocol) address, a fully qualified domain name (FQDN), or some other type of identifier.

Figure 4:
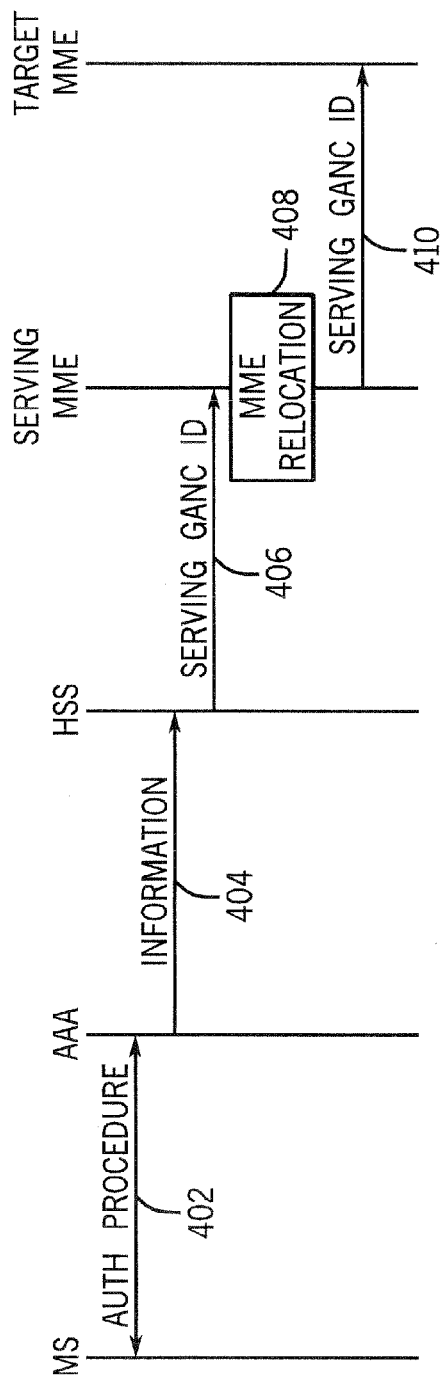
FIGS. 4 and 5 illustrate message flow diagrams according to some embodiments.

As depicted in FIG. 4, the authentication procedure performed by the mobile station is represented as 402. The information sent from the AAA server to the HSS is represented as 404. Assuming that the mobile station originally performs a registration procedure with the GANC 206 while the mobile station is in a tracking area (TA1 or TA2) of the GAN coverage area 202, then the information sent from the AAA server to the HSS as part of the authentication procedure would include an identity of the serving GANC 206.

The HSS sends (at 406) the identity of the serving GANC to the serving MME, such as over the S6a interface 140 shown in FIG. 1 between the HSS and the MME. For example, when the mobile station 232 is in either tracking area TA1 or TA2, and served by the MME 214, the identity of the serving GANC is sent from the HSS to the serving MME 214. Upon MME relocation (408), resulting from a mobile station transitioning between different tracking areas of the EUTRA domain that causes the active context to be transferred from the serving MME to a target MME, the serving MME sends (at 410) the serving GAN identifier to the target MME. For example, if the mobile station transitions from tracking area TA2 to tracking area TA3, then the mobile station is relocated from MME 214 to MME 216, which causes the active context associated with the mobile station to be transferred from MME 214 to MME 216.

When in idle mode, a mobile station is to re-register and perform a location update upon any significant change in location of the mobile station to ensure a current MSC-MME-GANC binding. A "significant change in location" can refer to the location of the mobile station satisfying some criterion, such as being served by a different base station, movement by greater than some predefined distance, and so forth. For example, the re-registration performed by the mobile station can be triggered by the mobile station crossing a tracking area boundary within the EUTRA domain.

Figure 5:
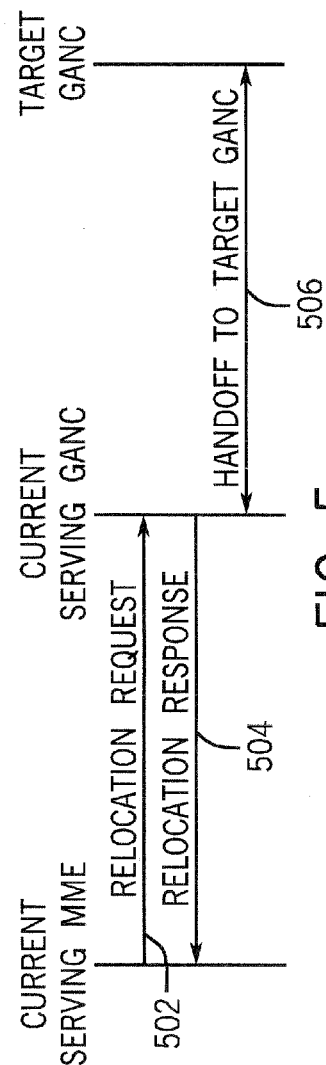

FIG. 5 depicts a simplified message flow diagram of a handoff between different GANCs resulting from a packet-switched domain-to-circuit-switched domain transition, such as the transition depicted by arrow 306 in FIG. 3. The current serving MME sends (at 502) a relocation request to the current serving GANC, as identified by the serving GAN identifier that is maintained by the current serving MME. Note that the current serving MME can be either the serving MME or the target MME depicted in FIG. 4. In response to the relocation request, the current serving GANC sends a relocation response (at 504) back to the current serving MME. As a result of the relocation messaging exchange, a transfer is performed (at 506) from the current serving GANC to the target GANC (such as from the GANC 206 to the GANC 208 shown in FIG. 3).

Figure 6:
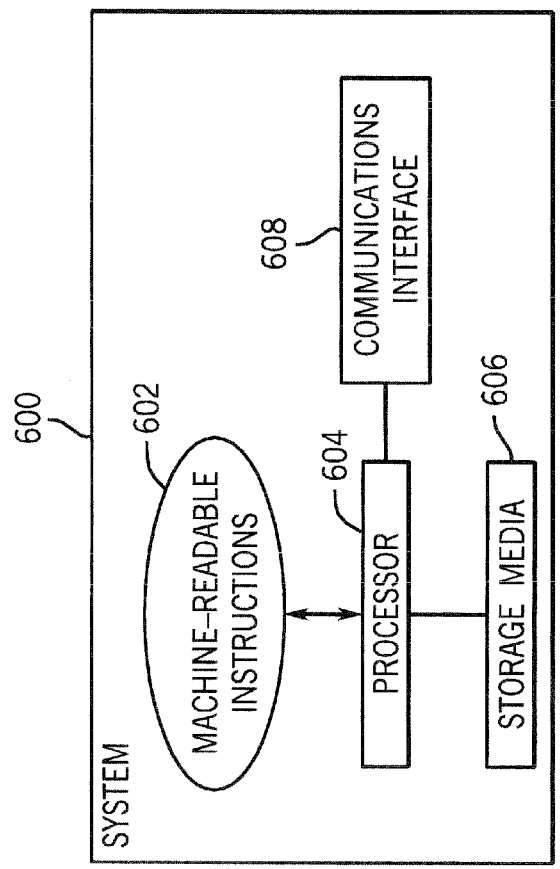
FIG. 6 is a block diagram of an example arrangement of a communications node according to some embodiments.

FIG. 6 illustrates an example communications node 600, which can be any of the nodes depicted in FIGS. 1-3, such as a mobile station, an MME, a GANC, and so forth. The communications node 600 includes machine-readable instructions 602 executable on a processor (or multiple processors) 604. The processor(s) is (are) connected to storage media 606 and a communications interface 608. The communications interface 608 allows the communications node to communicate with another node. In some examples, the communications interface 608 is a wireless interface to communicate wirelessly with a remote node. Alternatively, the communications interface can be a wired interface to communicate over a wired connection (e.g., electrical connection, optical connection, etc.).

The machine-readable Instructions 602 are loaded for execution on the processor(s) 604. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A communication system, comprising:
   a packet switched wireless access network;
   a circuit switched wireless access network;
   a first access network controller;
   a first mobility management entity, the first mobility management entity being configured to cooperate with the first access network controller to provide a circuit switched service to a mobile station while the mobile station is attached to the packet switched wireless access network in a first coverage area;
   a second access network controller;
   a second mobility management entity associated with a second coverage area, the second mobility management entity being configured to cooperate with the first access network controller to provide a circuit switched service to the mobile station when the mobile station has moved from the first coverage area to the second coverage area; and
   a home subscriber system configured to provide to the second mobility management entity information identifying the first access network controller as serving the mobile station to enable the second mobility management entity to initiate handoff of the mobile station from the packet switched wireless access network to the circuit switched wireless access network.

2. The communication system of claim 1, wherein the second mobility management entity is further configured to initiate handoff of the mobile station from the packet switched wireless access network to the circuit switched wireless access network while the mobile station is in the second coverage area.

3. The communication system of claim 1, wherein the second mobility management entity is further configured to initiate handoff of the mobile station from the packet switched wireless access network to the circuit switched wireless access network by communicating handoff-related messaging to the first access network controller.

4. The communication system of claim 3, wherein the first access network controller is configured to be responsive to the handoff-related messaging to hand off the mobile station to the second access network controller.

5. The communication system of claim 1, wherein the home subscriber system is configured to provide the information identifying the first access network controller as serving the mobile station to the second mobility management entity via the first mobility management entity.

6. The communication system of claim 5, wherein the first mobility management entity is configured to send the information identifying the first access network controller as serving the mobile station responsive to transition of the mobile station from the first mobility management entity to the second mobility management entity.

7. The communication system of claim 5, wherein the home subscriber system is configured to provide the information identifying the first access network controller as serving the mobile station responsive to the mobile station registering with the first access network controller.

8. The communication system of claim 1, wherein the packet switched wireless access network is an Evolved Universal Terrestrial Radio Access (EUTRA) network.

9. The communication system of claim 1, wherein the circuit switched service is a circuit switched voice service.

* * * * *